United States Patent
Walker et al.

(10) Patent No.: US 7,957,333 B2
(45) Date of Patent: Jun. 7, 2011

(54) RECEIVER SYSTEM AND METHOD FOR SWITCHING AMONG A PLURALITY OF ANTENNA ELEMENTS TO RECEIVE A SIGNAL

(75) Inventors: Glenn A. Walker, Greentown, IN (US); Eric A. Dibiaso, Kokomo, IN (US); Jerral A. Long, Kokomo, IN (US); Michael L. Hiatt, Jr., Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 930 days.

(21) Appl. No.: 11/901,893

(22) Filed: Sep. 19, 2007

(65) Prior Publication Data

US 2009/0075617 A1    Mar. 19, 2009

(51) Int. Cl.
*H04W 4/00* (2009.01)
(52) U.S. Cl. .......................................... 370/314; 370/338
(58) Field of Classification Search ........................ None
See application file for complete search history.

(56) References Cited

U.S. PATENT DOCUMENTS

| | | | | |
|---|---|---|---|---|
| 4,977,616 A * | 12/1990 | Linder et al. | | 455/277.2 |
| 5,241,701 A * | 8/1993 | Andoh | | 455/272 |
| 2005/0276239 A1 * | 12/2005 | Smallcomb et al. | | 370/316 |
| 2006/0194562 A1 * | 8/2006 | Marrah et al. | | 455/334 |

* cited by examiner

*Primary Examiner* — Chirag G Shah
*Assistant Examiner* — Salvador E Rivas
(74) *Attorney, Agent, or Firm* — Jimmy L. Funke

(57) ABSTRACT

A receiver system and method for switching among a plurality of antenna elements to receive a signal. At least a portion of plurality of antenna elements receive a transmitted signal, such that the transmitted signal includes a plurality of sub-channels that are transmitted in predetermined time intervals. A switching device is in communication with the plurality of antenna elements, and switches among single antenna elements to receive the transmitted signal. A controller is in communication with the switching device, and commands the switching device to select each of the antenna elements separately in predetermined periods of time based upon the predetermined time intervals of each of the sub-channels. A power level of the transmitted signal is determined during the predetermined period of time that corresponds to the predetermined time intervals, and the controller commands the switching device to switch to an antenna element based upon the determined power level.

15 Claims, 6 Drawing Sheets

RECEIVER SYSTEM AND METHOD FOR SWITCHING AMONG A PLURALITY OF ANTENNA ELEMENTS TO RECEIVE A SIGNAL

TECHNICAL FIELD

The present invention generally relates to a receiver system and method for receiving a signal, and more particularly, to a receiver system and method for switching among a plurality of antenna elements to receive a signal.

BACKGROUND OF THE DISCLOSURE

Generally, a receiver system can include multiple antennas for receiving different signals or the same signals. One example of such a system is where a first antenna is used to receive a first signal, and a second antenna is configured to receive a second signal. Thus, the first and second antennas generally cannot be used to receive both the first and second signals because the signals are being transmitted differently (i.e., transmitted in different modulation formats) or being transmitted from different sources.

Another example of a receiver system having multiple antennas is a receiver system that uses a blind antenna switching method. Generally, a blind antenna switching method is where a first antenna is used to receive a signal, and the receiver system switches to the second antenna when a power level of the signal received by the first antenna is below a predetermined level. Typically, the receiver system using the blind antenna switching method does not know the power level of the signal received by the second antenna until the receiver system switches to the second antenna. Generally, the receiver system is assuming that since the power level of the signal received by the first antenna is below the predetermined value that the signal received by the second antenna is likely to be equal to or better than the power level of the signal received by the first antenna prior to switching. Generally, the receiver system blindly switches back to the first antenna when the power level of the signal received by the second antenna is below a predetermined level. However, when blindly switching between the first and second antennas, the power level of the signal being received by the other antenna is unknown until the receiver system switches to that antenna.

SUMMARY OF THE INVENTION

According to one aspect of the present invention, a receiver system includes a plurality of antenna elements, a switching device, and a controller. At least a portion of the plurality of antenna elements receive a transmitted signal, wherein the transmitted signal includes a plurality of sub-channels that are transmitted in predetermined time intervals. The switching device is in communication with the plurality of antenna elements, and switches among single antenna elements to receive the transmitted signal. The controller is in communication with the switching device, and commands the switching device to select each of the plurality of antenna elements separately in predetermined periods of time based upon the predetermined time intervals of each of the sub-channels. A power level of the signal is determined during the predetermined period of time that corresponds to the predetermined time intervals, and the controller commands the switching device to switch to an antenna element based upon the determined power level.

According to another aspect of the present invention, a receiver system includes a plurality of antenna elements, a switching device, and a receiving module. At least a portion of the plurality of antenna elements receives a transmitted signal that is time division multiplexed (TDM), such that the transmitted signal includes a plurality of sub-channels that are transmitted in predetermined time intervals. The switching device is in communication with the plurality of antenna elements, and switches among single antenna elements to receive the transmitted signal. The receiving module houses a controller that is in communication with the switching device, wherein the controller commands the switching device to select each of the plurality of antenna elements separately in predetermined periods of time based upon the predetermined time intervals of each of the sub-channels. The receiving module processes the transmitted signal to produce an output based upon a selected sub-channel, and determines a power level of the transmitted signal at at least a portion of the plurality of antenna elements during a predetermined period of time that corresponds to the time interval of a non-selected sub-channel, wherein the controller commands the switching device to switch to an antenna element with a greater determined power level to receive the transmitted signal during the time interval of the selected sub-channel.

According to yet another aspect of the present invention, a method of switching among antenna elements in a receiver system includes the steps of transmitting a signal including a plurality of sub-channels, wherein the sub-channels are transmitted in predetermined time intervals, and receiving the transmitted signal by an antenna element of a plurality of antenna elements, wherein the transmitted signal containing a selected sub-channel is processed. The method further includes the steps of switching among at least a portion of the plurality of antenna elements, and receiving the transmitted signal during a predetermined period of time that corresponds to the predetermined time intervals of the non-selected sub-channels, determining a power level of the transmitted signal during the predetermined period of time, and switching to the antenna element receiving the transmitted signal at a greater determined power level during the predetermined time interval of the selected sub-channel.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
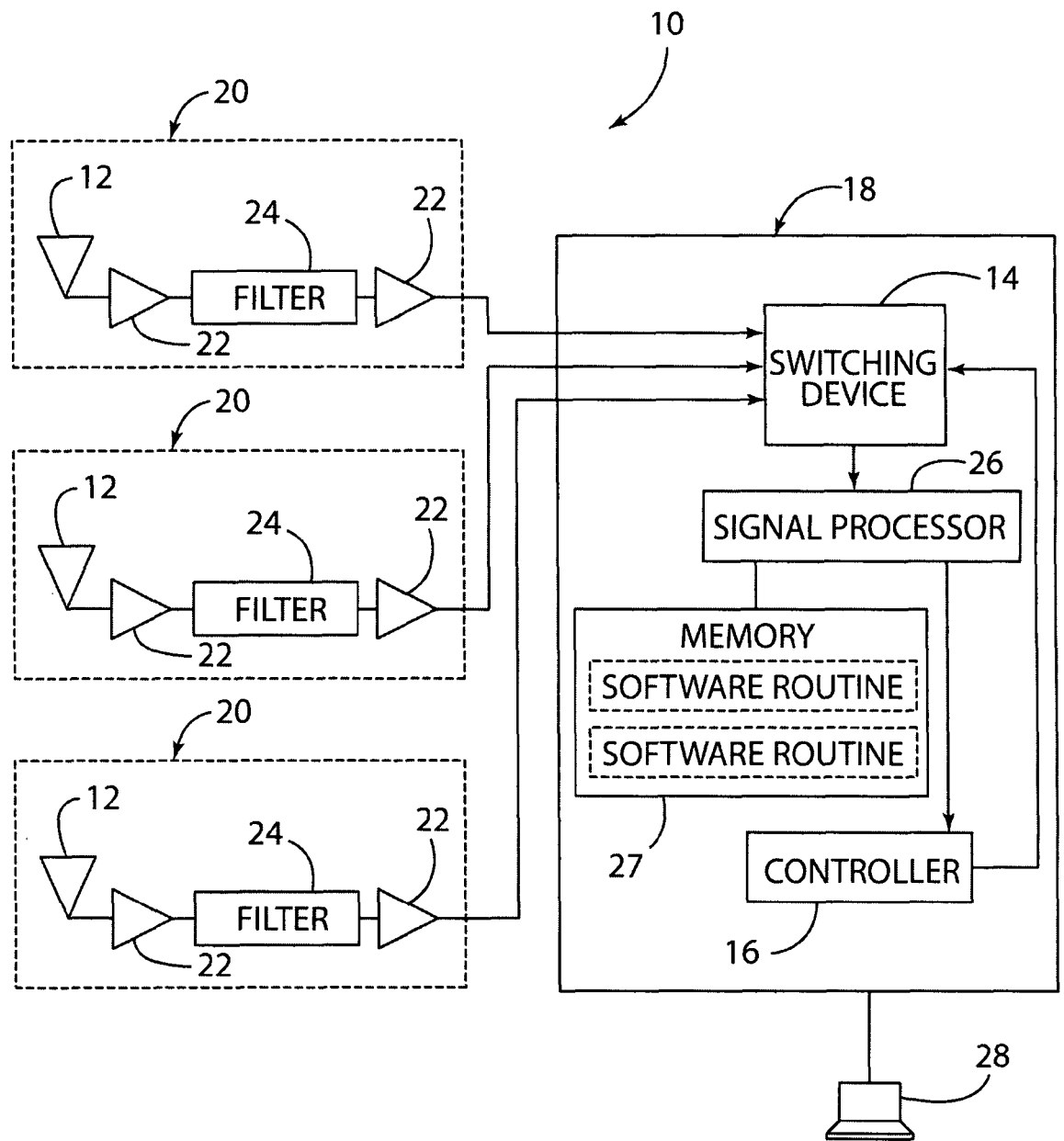
FIG. 1 is a block diagram of a receiver system having a plurality of antenna modules, according to one embodiment of the present invention.

In reference to FIG. 1, a receiver system is generally shown at reference identifier 10. The receiver system 10 includes a plurality of antenna elements 12, wherein at least a portion of the plurality of antenna elements 12 receive a transmitted signal. The transmitted signal includes a plurality of sub-channels that are transmitted in predetermined time intervals, such that the desired data is transmitted within at least one of the sub-channels, as described in greater detail below. The receiver system 10 also includes a switching device 14 that is in communication with a plurality of antenna elements 12. The switching device 14 selects a single antenna element of the plurality of antenna elements 12 to receive the transmitted signal.

The receiver system 10 further includes a controller 16 that is in communication with the switching device 14. The controller 16 commands the switching device 14 to select each of the plurality of antenna elements 12 separately in predetermined periods of time based upon the predetermined time intervals of each of the sub-channels. According to one embodiment, a power level of the transmitted signal is determined during a predetermined period of time that corresponds to the predetermined time intervals of the sub-channels, as described in greater detail herein.

According to one embodiment, the transmitted signal is time division multiplexed (TDM). Generally, a TDM signal includes a plurality of sub-channels, which appear to be transferred simultaneously, but are individually transmitted during recurrent time intervals that are fixed in length. Typically, the sub-channels of the transmitted TDM signal appear as data bursts, such that the data received in the selected sub-channel is processed to emit an output during the period of time that the selected sub-channel and other sub-channels or non-selected sub-channels, are being transmitted, without leaving a null or void in the output. Thus, the non-selected sub-channels are the sub-channels that contain data that is not currently being used or processed to emit the output. By way of explanation and not limitation, an existing system that transmits such a TDM signal is the Sirius® satellite system.

Figure 2:
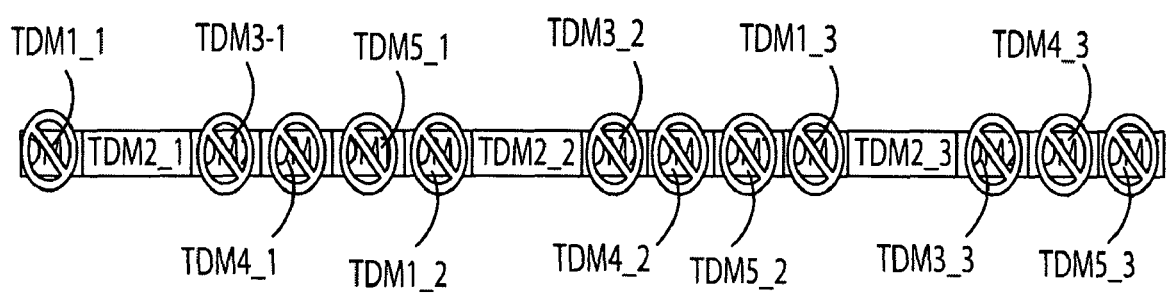
FIG. 2 is a diagram illustrating time intervals of sub-channels of a transmitted time division multiplexed (TDM) signal, according to one embodiment of the present invention.

With regards to FIGS. 1-4, an exemplary diagram of sub-channels being transmitted in a TDM signal is shown in FIG. 2. For purposes of explanation and not limitation, if sub-channel TDM2 contains the data that is currently desired (i.e., TDM2 is the selected sub-channel and TDM1, TDM3, TDM4, and TDM5 are the non-selected sub-channels), one of the antenna elements 12 receives the transmitted TDM signal, and the data received during the TDM2 sub-channel time interval is processed to produce the emitted output. According to one embodiment, the data processed from the TDM2 sub-channel is received during a first predetermined time interval (e.g., TDM2_1), and processed during the time intervals where sub-channels TDM3_1, TDM4_1, TDM5_1, and TDM1_2 are received. Thus, the selected sub-channel is processed and an output is emitted based upon the selected sub-channel during the period of time that corresponds to the predetermined time intervals of the non-selected sub-channels, and the predetermined time interval of the selected sub-channel.

During the predetermined time intervals where the non-selected sub-channels are being received, the receiving system 10 can alternate which antenna element 12 is being used to receive the signal to determine if the signal can be received at a greater power level using a different antenna element 12. By switching between antenna elements 12 during the predetermined time intervals of the non-selected sub-channels, and thus, the data being transmitted in the sub-channel does not have to be processed, the receiver system 10 does not have to lock to the phase of the signal received by the different antenna elements 12. Thus, the antenna element 12 can be selected, and the power level of the signal can be determined without being required to process the received signal.

According to one embodiment shown in FIG. 1, the switching device 14 is housed in a receiver module generally indicated at 18, and each antenna element 12 is housed in a separate antenna module generally indicated at 20. According to one embodiment, the antenna module 20 also houses at least one low-noise amplifier (LNA) 22, wherein one LNA 22 is in communication with the antenna element 12. According to a disclosed embodiment, a filter 24 is in communication between multiple LNAs 22, which typically removes undesirable noise from the received signal.

According to one embodiment, the receiver module 18 houses a signal processor 26 in communication with the switching device 14. According to a disclosed embodiment, the signal processor 26 is in communication with a memory device 27 that includes one or more software routines for processing the received signal. Additionally or alternatively, the signal processor 26 includes circuitry for processing the received signal. According to a disclosed embodiment, the signal processor 26 down-converts the radio frequency (RF) of the received signal from the antenna element 12 to a lower frequency, and digitally demodulates the received signal. It should be appreciated by those skilled in the art that the signal processor 26 can function digitally or include circuitry for processing the received signal in a desirable manner. Additionally, when the non-selected sub-channels are received, the signal processor 26 can determine the power level of the received signal without processing the received signal to produce an emitted output, according to one embodiment.

According to one embodiment, an audio output is produced by the receiver module 18 based upon the received signal using a speaker 28. It should be appreciated by those skilled in the art that the output emitted by the receiver module 18 can be an audio output, a video output, or a combination thereof. Additionally, the signal processor 26 is in communication with the controller 16, such that the controller 16 can control the switching device 14 based upon the signal received and processed by the signal processor 26, according to one embodiment.

Figure 3:
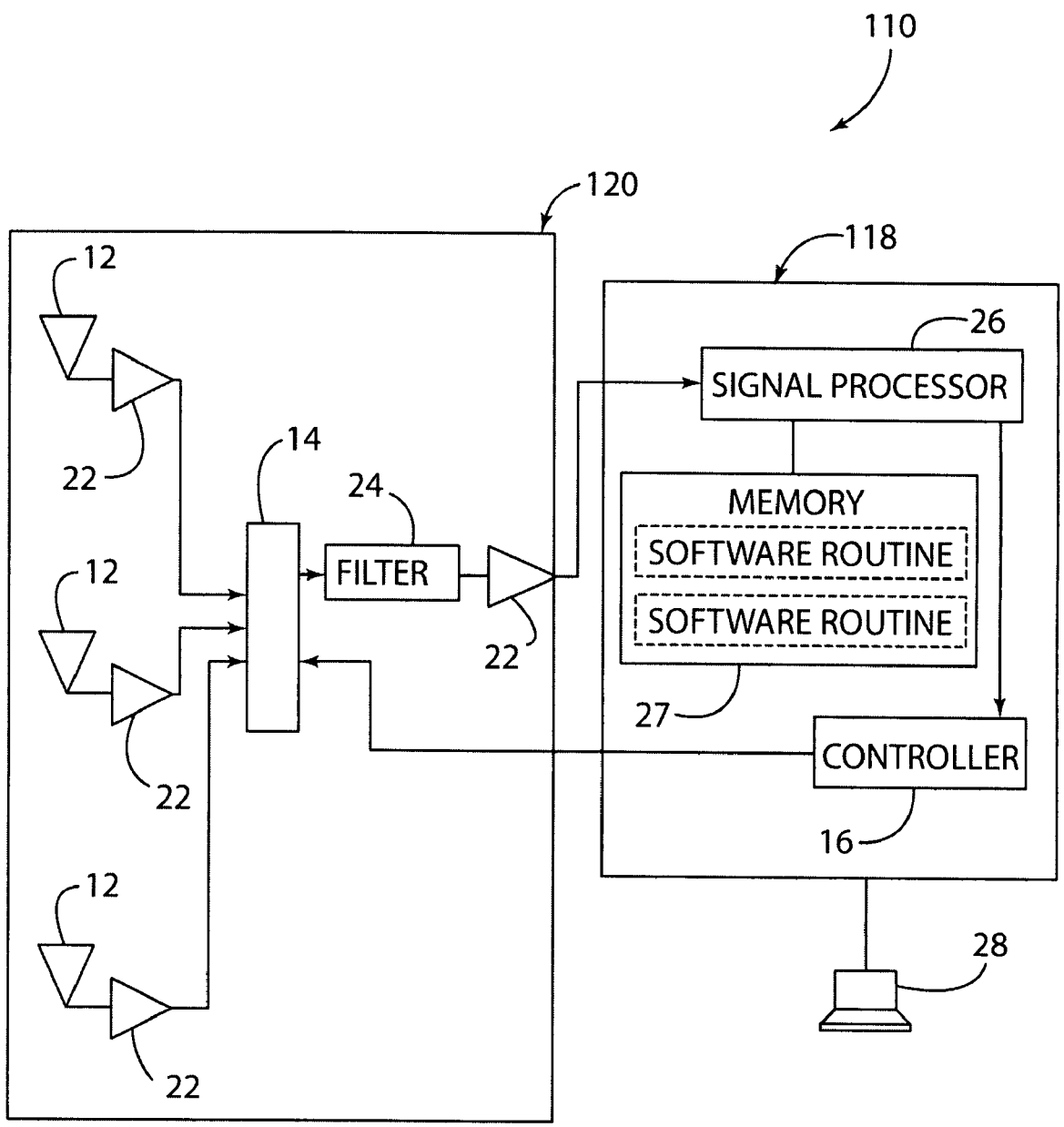
FIG. 3 is a block diagram of a receiver system having a single antenna module, in accordance with an alternate embodiment of the present invention.

In reference to FIG. 3, an alternate embodiment of the receiver system 10 is generally shown at reference identifier 110, wherein like reference characters indicate like elements. An antenna module 120 houses the plurality of antenna elements 12. Additionally, the antenna module 120 houses the LNAs 22 that are in communication with the antenna elements 12, the switching device 14 that is in communication with the LNAs 22 to switch among the antenna elements 12, and a filter 24 in communication with the switching device 14, according to one embodiment. Additionally, a receiver module 118 can include the signal processor 26 and controller 16, according to a disclosed embodiment.

According to the embodiment of FIG. 3, the receiver module 118 houses a signal processor 26 in communication with a memory device 27 that includes one or more software routines for processing the received signal. An audio output is produced by the receiver module 118 based upon the received signal using a speaker 28. It should be appreciated by those skilled in the art that the output emitted by the receiver module 118 can be an audio output, a video output, or a combination thereof.

Figure 4:
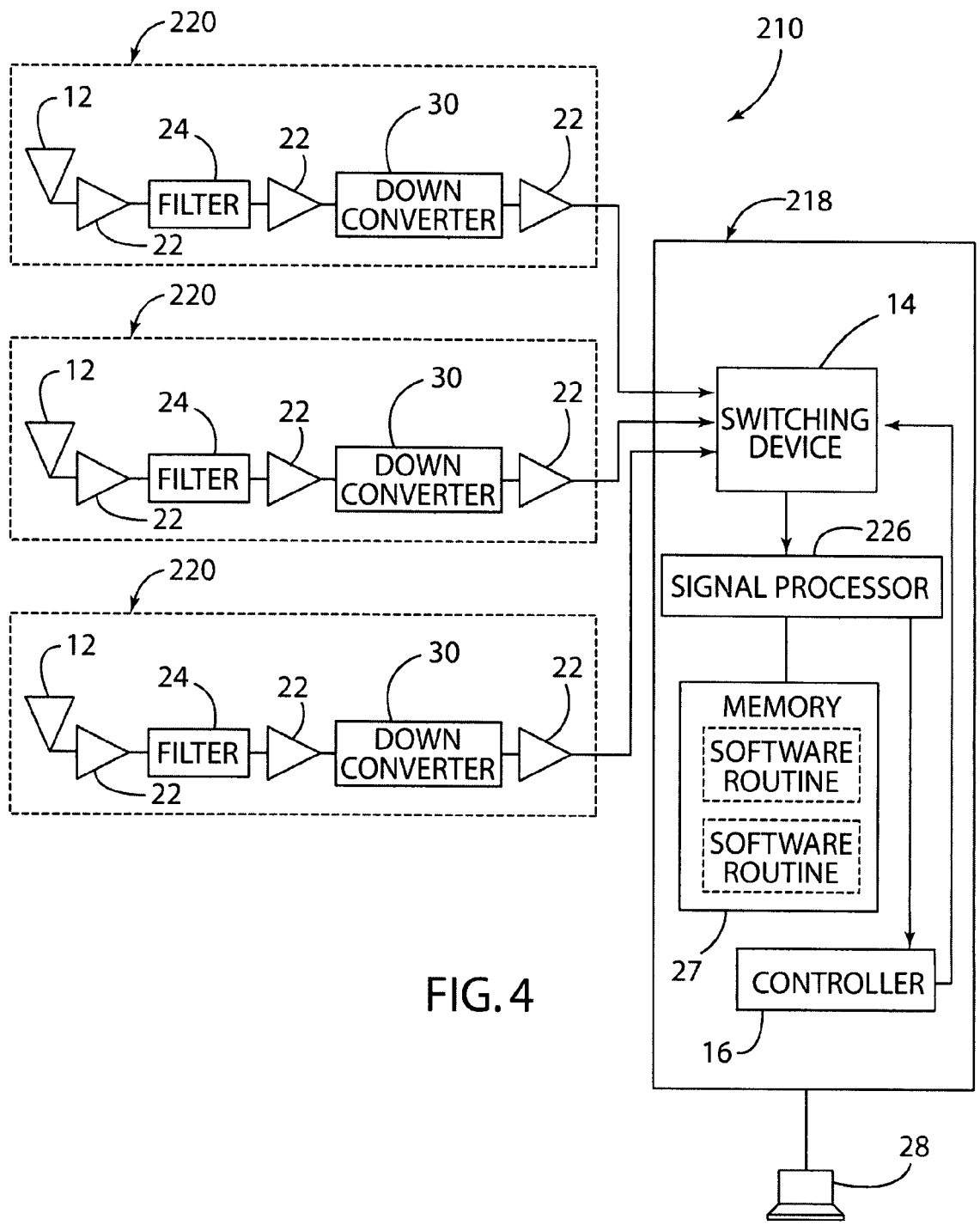
FIG. 4 is a block diagram of a receiver system having a plurality of antenna modules, in accordance with an alternate embodiment of the present invention.

With regards to FIG. 4, an alternate embodiment of a receiver system is generally shown at reference identifier 210, wherein like reference characters indicate like elements. According to an alternate embodiment, an antenna module 220 houses the antenna elements 12, the LNAs 22, the filter 24, and a down-converter device 30. Typically, the down-converter device 30 converts the RF level of the received signal from the antenna element 12 to a lower frequency, such that the received signal can be communicated through the receiver system 210. According to one embodiment, a receiver module 218 can house the switching device 14, the controller 16, a signal processor 226, and the memory device 27. According to a disclosed embodiment, the signal processor 226 includes the circuitry and/or implements one or more software routines stored in the memory device 27 for digitally demodulating the received signal. However, it should be appreciated by those skilled in the art that the receiver module 18,118,218 can include additional circuitry and/or one or more software routines in order to perform other signal processing functions.

According to the embodiment of FIG. 4, the receiver module 218 houses a signal processor 226 in communication with a memory device 27 that includes one or more software routines for processing the received signal. An audio output is produced by the receiver module 218 based upon the received signal using a speaker 28. It should be appreciated by those skilled in the art that the output emitted by the receiver module 218 can be an audio output, a video output, or a combination thereof.

Figure 5:
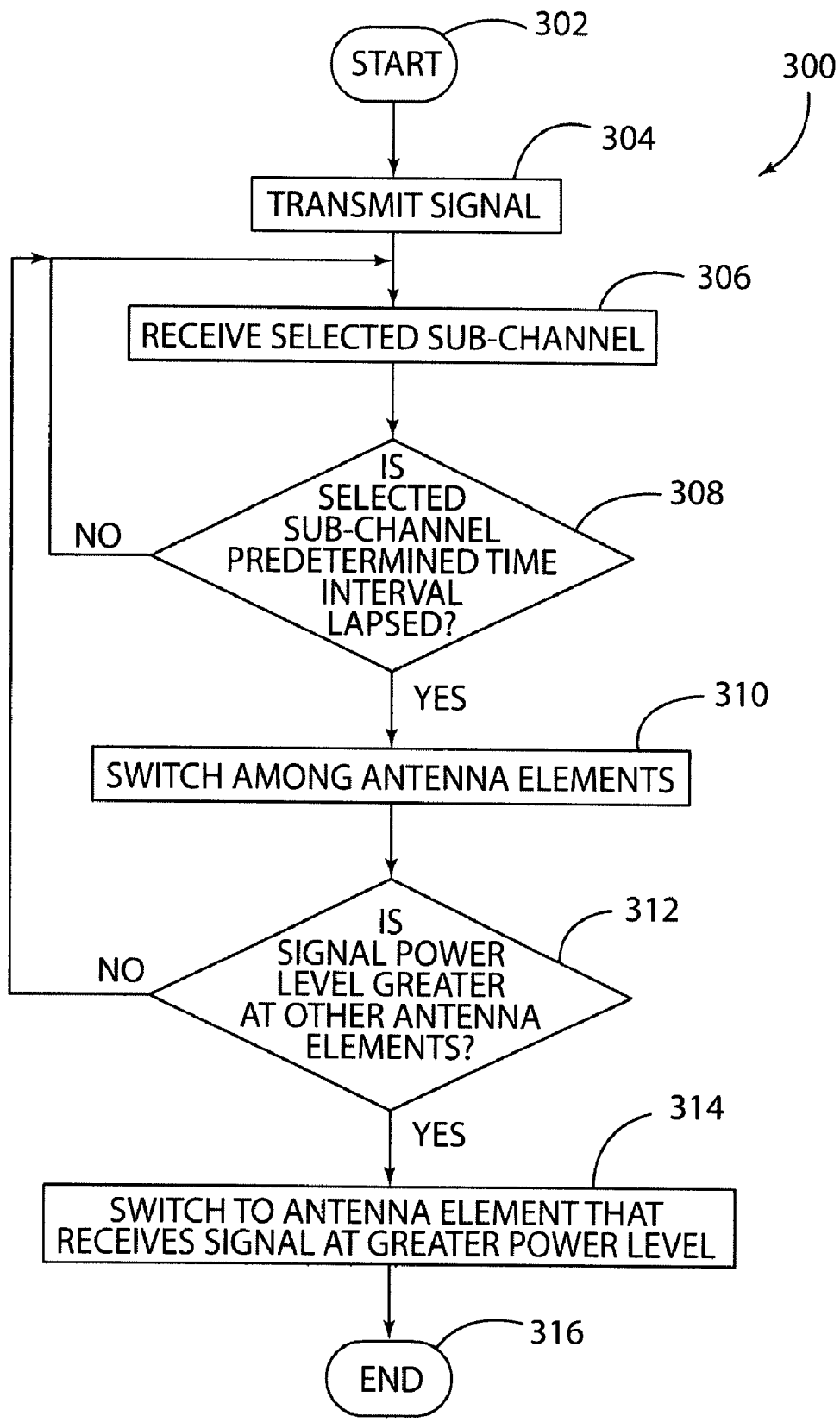
FIG. 5 is a flow chart illustrating a method of switching among antenna elements of a receiver system, in accordance with one embodiment of the present invention.

In reference to FIGS. 1-5, a method of switching antenna elements 12 is generally shown in FIG. 5 at reference identifier 300. The method 300 starts at step 302, and proceeds to step 304, where the signal is transmitted. According to one embodiment, the transmitted signal is a TDM signal. At step 306, the selected sub-channel is received by the antenna element 12. At logic step 308, it is determined if the selected sub-channel predetermined time interval has lapsed. If it is determined that the predetermined time interval has not lapsed, then the method 300 returns to step 306 to continue receiving the selected sub-channel. According to one embodiment, the signal processor 26,226 processes the received signal during the time interval of the selected sub-channel and along the time intervals of the non-selected sub-routines to emit the output.

However, if it is determined at step 308 that the predetermined time interval for the selected sub-channel has lapsed, then the method 300 proceeds to step 310, where the switching device 14 switches among the antenna elements 12. Thus, each of the antenna elements 12 is used to receive the signal. At logic step 312, it is determined if the signal power level is greater using other antenna elements 12 than the antenna element 12 originally being used to receive the transmitted signal. According to one embodiment, the signal processor 26,226 processes the received signal during the time intervals of the non-selected sub-channels to determine the power level, but not to produce the emitted output.

If it is determined at step 312 that the antenna element 12 originally used to receive the transmitted signal has a greater signal power level, then the method 300 returns to step 306 to receive the transmitted signal during the time interval of the selected sub-channel. However, if it is determined at step 312 that the signal power level is greater at another antenna element 12, then the method 300 proceeds to step 314, wherein the switching device 14 switches to the antenna element 12 that receives the signal at a greater power level in order to receive the transmitted signal during the time interval of the selected sub-channel. The method 300 then ends at step 316.

Figure 6:
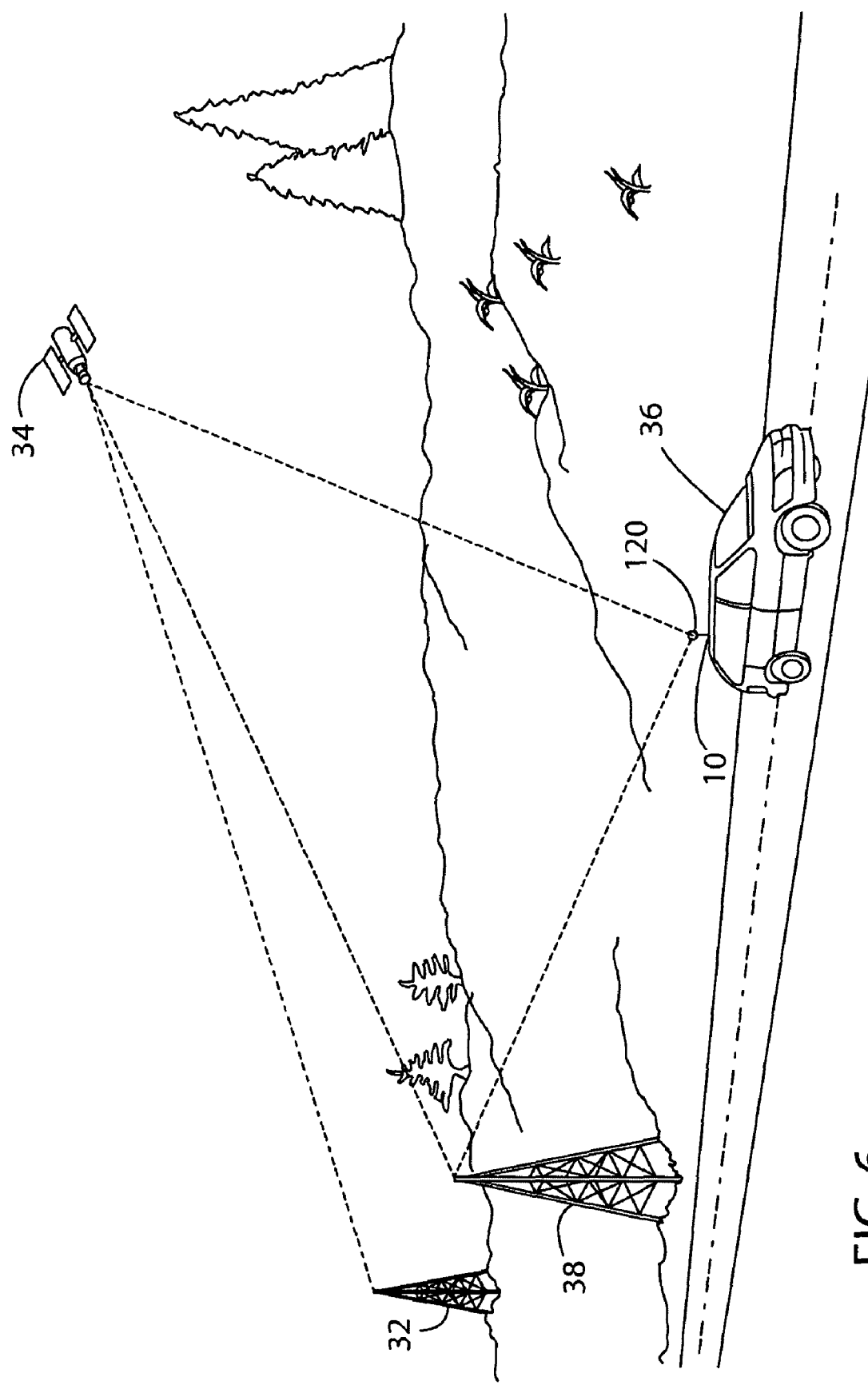
FIG. 6 is an environmental view of a receiver system, in accordance with one embodiment of the present invention.

By way of explanation and not limitation, in reference to FIG. 6, the receiver system 10 receives a signal that is transmitted from a transmitter 32 and re-transmitted by a satellite 34, such that the receiver system 10 is used in a satellite digital audio radio (SDAR). According to one embodiment, the receiver system 10 is used with a vehicle 36. Additionally, a terrestrial repeater 38 can be in communication with the satellite 34, such that the terrestrial repeater 38 receives the satellite RF signal from the satellite 34, and re-transmits the signal as a terrestrial RF signal, according to one embodiment.

Advantageously, the receiver system 10,110,210 and method 300 can switch among antenna elements 12 to determine which antenna element 12 receives the transmitted signal at a greater power level without needing to fully process the received signal, such as lock in a phase of the received signal at each antenna element 12. Since the signal is transmitted having sub-channels that are individually transmitted in predetermined time intervals, the receiver system 10,110, 210 can switch among the antenna elements 12 during the predetermined time period associated with the predetermined time intervals of the sub-channels that are not selected. Thus, the receiver system 10 can determine the power level of the received signal in order for the receiver system 10 to make a determination as to whether or not to switch to a different antenna element 12 when receiving the transmitted signal during the selected sub-channel time interval based upon the power level of the received signal at the particular antenna element 12, and not making a blind switch.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:
1. A receiver system comprising:
a plurality of antenna elements, wherein at least a portion of said plurality of antenna elements receives a transmitted signal, wherein said transmitted signal is time division multiplexed (TDM) and said transmitted signal comprises a plurality of sub-channels that are transmitted in predetermined time intervals, wherein said plurality of sub-channels comprises five said sub-channels, such that different data is transmitted in said five sub-channels;
a switching device in communication with said plurality of antenna elements, wherein said switching device switches among single antenna elements of said plurality of antenna elements to receive said transmitted signal;
a controller in communication with said switching device, wherein said controller commands said switching device to select each said plurality of antenna elements separately in predetermined periods of time based upon said predetermined time intervals of each of said plurality of sub-channels, such that a power level of said signal is determined during a predetermined period of time that corresponds to said predetermined time intervals, and wherein said controller commands said switching device to switch to an antenna element based upon said determined power level; and a receiver module in communication with said plurality of antenna elements, wherein said receiver module processes said transmitted signal to produce an output based upon said selected sub-channel, and determines said power level of said transmitted signal at at least a portion of said plurality of antenna elements during a predetermined period of time that corresponds to said time interval of a non-selected said sub-channel, and wherein said controller commands said switching device to switch to an antenna element with a greater said determined power level to receive said transmitted signal during said time interval of said selected sub-channel.

2. The receiver system of claim 1, wherein said receiver module houses at least one of said switching device and said controller.

3. The receiver system of claim 1 further comprising an antenna module housing at least one of said plurality of antenna elements.

4. The receiver system of claim 3, wherein said switching device is housed in said antenna module.

5. The receiver system of claim 1, wherein said receiver system is used with a vehicle device.

6. A receiver system comprising:
a plurality of antenna elements, wherein at least a portion of said plurality of antenna elements receives a transmitted signal that is time division multiplexed (TDM), such that said transmitted signal comprises a plurality of sub-channels that are transmitted in predetermined time intervals, wherein said plurality of sub-channels of TDM transmitted signal comprises five said sub-channels, such that different data is transmitted in said five sub-channels;
a switching device in communication with said plurality of antenna elements, wherein said switching device switches among single antenna elements of said plurality of antenna elements to receive said transmitted signal; and
a receiving module housing a controller in communication with said switching device, wherein said controller commands said switching device to select each said plurality of antenna elements separately in predetermined periods of time based upon said predetermined time intervals of each of said plurality of sub-channels, such that said receiving module processes said transmitted signal to produce an output based upon a selected said sub-channel, and determines a power level of said transmitted signal at at least a portion of said plurality of antenna elements during a predetermined period of time that corresponds to said time interval of a non-selected said sub-channel, wherein said controller commands said switching device to switch to an antenna element with a greater said determined power level to receive said transmitted signal during said time interval of said selected sub-channel,
wherein said receiving module processes said transmitted signal to produce an output based upon said selected sub-channel, and determines said power level of said transmitted signal at at least a portion of said plurality of antenna elements during a predetermined period of time that corresponds to said time interval of a non-selected said sub-channel, and wherein said controller commands said switching device to switch to an antenna element with a greater said determined power level to receive said transmitted signal during said time interval of said selected sub-channel.

7. The receiver system of claim 6, wherein said receiving module houses said switching device.

8. The receiver system of claim 6 further comprising an antenna module housing at least one of said plurality of antenna elements.

9. The receiver system of claim 8, wherein said switching device is housed in said antenna module.

10. The receiver system of claim 6, wherein said receiver system is used with a vehicle device.

11. A method of switching among antenna elements in a receiver system, said method comprising the steps of:
transmitting a signal comprising a plurality of sub-channels, wherein said sub-channels are transmitted in predetermined time intervals;
receiving said transmitted signal by an antenna element of a plurality of antenna elements, wherein said transmitted signal containing a selected sub-channel is processed;
switching among at least a portion of said plurality of antenna elements and receiving said transmitted signal during a predetermined period of time that corresponds to said predetermined time intervals of a non-selected sub-channel;
determining a power level of said transmitted signal during said predetermined period of time; and
switching to said antenna element receiving said transmitted signal at a greater determined power level during said predetermined time interval of said selected sub-channel,
wherein said TDM transmitted signal comprises five said sub-channels, such that different data is transmitted in said five sub-channels, and said predetermined time period corresponds to said predetermined time intervals of said non-selected sub-channels.

12. The method of claim 11, wherein said transmitted signal is time division multiplexed (TDM).

13. The method of claim 11, wherein said method is used with a vehicle device.

14. The method of claim 11 further comprising the step of providing a plurality of antenna elements, wherein said plurality of antenna elements receive said transmitted signal.

15. The method of claim 11 further comprising the step of providing a receiving module, wherein said receiving module processes said transmitted signal to determine said power level during said predetermined time period.

* * * * *